United States Patent
Lee et al.

(10) Patent No.: US 11,620,262 B2
(45) Date of Patent: Apr. 4, 2023

(54) GENERATION OF A METADATA-DRIVEN ARTIFICIAL INTELLIGENCE PLATFORM

(71) Applicant: International Business Machines Corporation, Armonk, NY (US)

(72) Inventors: Frank N Lee, Sunset Hills, MO (US); Joseph W. Dain, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 158 days.

(21) Appl. No.: 17/107,579

(22) Filed: Nov. 30, 2020

(65) Prior Publication Data

US 2022/0171738 A1 Jun. 2, 2022

(51) Int. Cl.
G06F 17/00 (2019.01)
G06F 16/172 (2019.01)
G06N 20/00 (2019.01)

(52) U.S. Cl.
CPC .......... G06F 16/172 (2019.01); G06N 20/00 (2019.01)

(58) Field of Classification Search
CPC .............. G06F 16/172; G06F 16/2465; G06F 16/24552; G06N 20/00
See application file for complete search history.

(56) References Cited

U.S. PATENT DOCUMENTS

| | | | | |
|---|---|---|---|---|
| 7,139,779 | B1 * | 11/2006 | Kornelson | G06F 16/283 707/999.203 |
| 7,249,219 | B1 * | 7/2007 | Mowat | G06F 12/0813 711/113 |
| 10,360,214 | B2 | 7/2019 | Gold et al. | |
| 2004/0133606 | A1 * | 7/2004 | Miloushev | H04L 67/1095 |
| 2018/0089593 | A1 | 3/2018 | Patel et al. | |
| 2018/0121601 | A1 * | 5/2018 | Hahm | G16B 50/30 |

OTHER PUBLICATIONS

Bing Zhang Network-aware data caching and prefetching for cloud-hosted metadata retrieval. In Proceedings of the Third International Workshop on Network-Aware Data Management, Association for Computing Machinery, 1-10,<https://doi.org/10.1145/2534695.2534700>, Nov. 2013.*

IBM Corp., "Data provenance", [online], [retrieved on Nov. 27, 2020], Retrieved from the Internet at <URL: <https://www.ibm.com/support/knowledgecenter/en/SSWRJV_10.1.0/lsf_admin/data_provenance.html>, 3 pp.

* cited by examiner

*Primary Examiner* — Greta L Robinson
(74) *Attorney, Agent, or Firm* — Konrad Raynes Davda & Victor LLP; Rabindranath Dutta

(57) ABSTRACT

A set of metafiles that stores at least metadata information and provenance information of an artificial intelligence (AI) process is generated, where the AI process is trained with a source data. The set of metafiles is accessed via an application programming interface (API) to the set of metafiles. In response to accessing the set of metafiles, the source data in the set of metafiles is transferred to a cache for processing by the AI process.

20 Claims, 10 Drawing Sheets

GENERATION OF A METADATA-DRIVEN ARTIFICIAL INTELLIGENCE PLATFORM

BACKGROUND

The disclosure relates to the generation of a metadata-driven artificial intelligence platform.

Machine learning is the study of computer algorithms that improve automatically through experience. Machine learning may be regarded as a subset of artificial intelligence. Machine learning algorithms build a model based on sample data in order to make predictions or decisions without being explicitly programmed to do so. The sample data may also be referred to as "training" data. After training, when the model is provided with an input, an output is generated to make predictions or decisions.

Artificial neural networks (also referred to as neural networks) are computing systems that may have been inspired by the biological neural networks that constitute animal brains. Neural networks may be configured to use a feedback mechanism to learn to perform certain computational tasks. Neural networks are a type of machine learning mechanism. Deep learning is part of a broader family of machine learning methods based on artificial neural networks with representation learning. Various frameworks (e.g. PyTorch*, TensorFlow*, etc.) are available for deep learning environments, making it easier to learn, build and train diversified neural networks.

Datasets are an integral part of the field of machine learning. Major advances in the machine learning field have resulted from advances in learning algorithms (such as deep learning), computer hardware, and the availability of high-quality training datasets.

In artificial intelligence, data analytics is the process of analyzing raw data to determine trends and answer questions. "Provenance" is a term that refers to the pedigree of the data, i.e., the record of components, inputs, systems, and processes that affect collected data, and a historical context. Provenance provides an understanding of where the data comes from, how the data is collected and how the data can best be used. This allows data analytics and artificial intelligence techniques to be used effectively and allows the reliability of the data analytics and artificial intelligence techniques to be assessed.

SUMMARY OF THE PREFERRED EMBODIMENTS

Provided are a method, system, computer program product, and a metadata-driven artificial intelligence platform in which a set of metafiles that stores at least metadata information and provenance information of an artificial intelligence (AI) process is generated, wherein the AI process is trained with a source data. The set of metafiles is accessed via an application programming interface (API) to the set of metafiles. In response to accessing the set of metafiles, the source data in the set of metafiles is transferred to a cache for processing by the AI process. As a result, a metadata-driven AI platform is generated, and a plurality of different AI processes may be managed within the AI platform.

In additional embodiments, the set of metafiles is comprised of an input metafile and a runtime metafile. As a result, both the datasets and the runtime environment of an AI process may be recreated or managed by using the set of files in the AI platform.

In yet additional embodiments, the runtime metafile stores the provenance information, wherein the provenance information comprises information relating to a framework, an algorithm, and a model of the AI process. As a result, the runtime metafile may be used to recreate the execution environment of an AI process.

In further embodiments, the input metafile stores at least filenames and resolvable addresses of each file of the source data. As a result, the input metafile may be used to determine the datasets used for training and other operations in the AI process.

In yet further embodiments, the API is comprised of: a first interface to access the set of metafiles to retrieve metadata; a second interface to generate the cache; a third interface to trigger actions including moving or copying of data to the cache; and a fourth interface to record the provenance information in the runtime metafile. As a result, the API may be used to at least access the set of metafiles and recreate the environment of an AI process.

Provided also is an application programming interface (API) for a metadata-driven artificial intelligence platform implemented in a computational device, wherein the API is comprised of: a first interface to access a set of metafiles to retrieve metadata; a second interface to generate a cache; a third interface to trigger actions including moving or copying of data to the cache; and a fourth interface to record a provenance information in a runtime metafile. As a result, the components of the artificial intelligence platform are accessed via the API.

In additional embodiments of the API, the metadata-driven artificial intelligence platform is comprised of: the set of metafiles, wherein the set of metafiles store at least metadata information and the provenance information of an artificial intelligence (AI) process that is trained with a source data; the application programming interface for accessing the set of metafiles; and the cache to which the source data in the set of metafiles is transferred for processing by the AI process, in response to accessing the set of metafiles. As a result, the metadata-driven artificial intelligence platform may be used in association with the API.

In yet additional embodiments of the API, the set of metafiles is comprised of an input metafile and the runtime metafile. In further embodiments of the API, the runtime metafile stores the provenance information, wherein the provenance information comprises information relating to a framework, an algorithm, and a model of the AI process. In yet further embodiments of the API, the input metafile stores at least filenames and resolvable addresses of each file of the source data. As a result, the API is used for generating information from the input metafile and runtime metafile to recreate the execution environment for an AI process.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

While artificial intelligence model training frameworks, algorithms and scripts may be containerized and made portable and reusable by certain mechanisms, the underlying training data is not containerized and made portable and reusable by such mechanisms. Training datasets may be comprised of thousands or millions of files or objects separated into training and validation data with labels. The construct of the dataset may be maintained as raw files in directories, or maintained in buckets and separate files, or maintained in objects with labels. When new data is added to the collection or labels are changed, another dataset may have to be created for the model to be updated or tracked, in order to preserve the lineage and provenance of the AI model. All these present challenges to make AI portable, reusable and auditable, where the AI techniques may use various learning mechanisms, such as deep learning.

Certain embodiments propose an artificial intelligence data platform comprising of components that include:

(1) a set of metafiles that encapsulate all the metadata and provenance of AI processing;

(2) an application programming interface (API) for accessing the metafiles; and (3) a scratch or cache storage space for staging the dataset.

As a result, the set of metafiles may be used for an artificial intelligence-based data analytics system effectively and reliably, in order to improve the functionality of a computational device.

Figure 1:
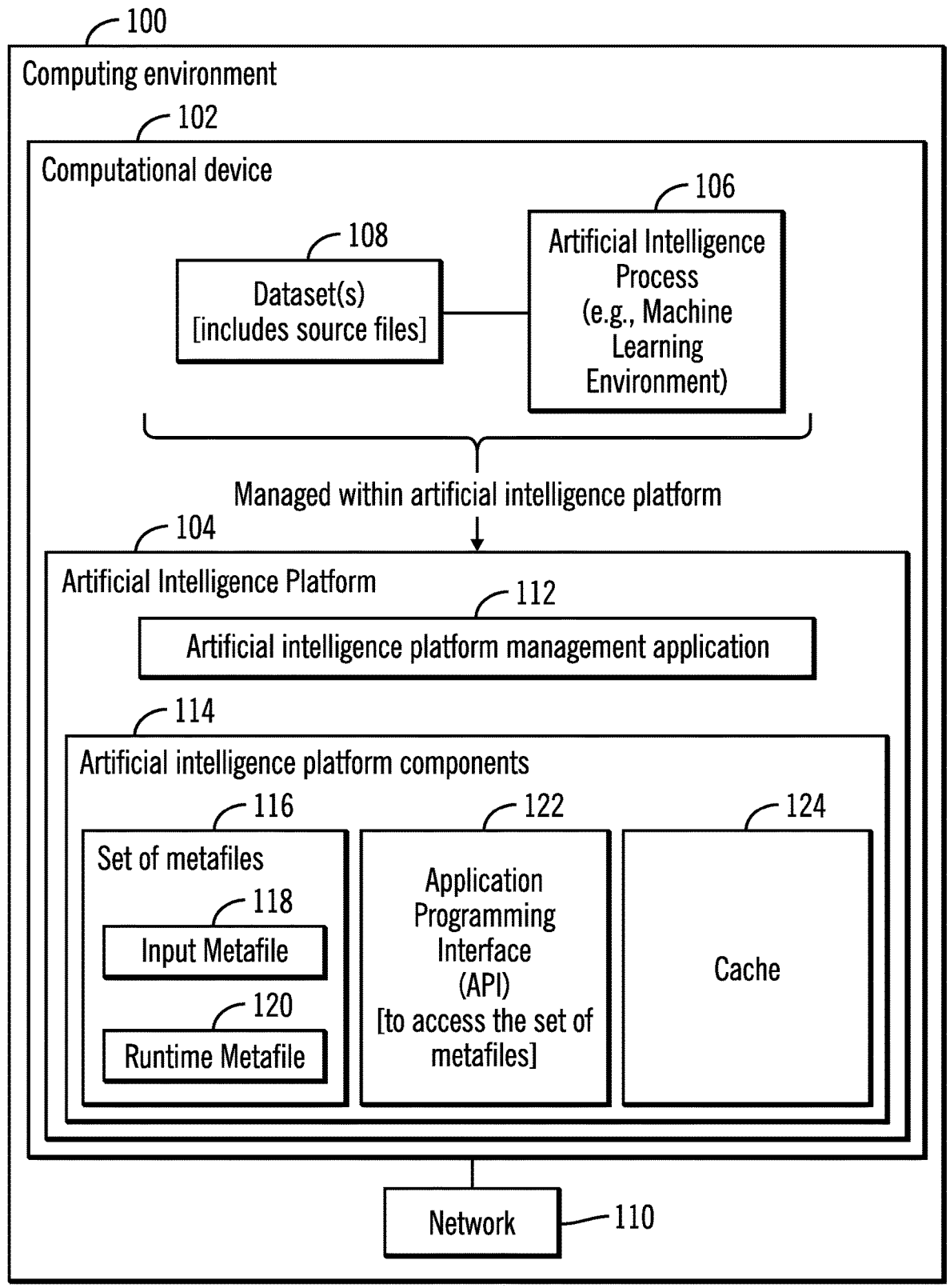
FIG. 1 illustrates a block diagram of a computing environment comprising a computational device in which an artificial intelligence platform (AI) manages a plurality of artificial intelligence processes and corresponding datasets, in accordance with certain embodiments.

FIG. 1 illustrates a block diagram of a computing environment 100 comprising a computational device 102 in which an artificial intelligence platform (AI) 104 manages a plurality of artificial intelligence processes 106 and corresponding datasets 108, in accordance with certain embodiments.

The computational device 102 may comprise any suitable computational device including those presently known in the art, such as, a personal computer, a workstation, a server, a mainframe, a hand held computer, a palm top computer, a telephony device, a network appliance, a blade computer, a processing device, a controller such as a storage controller, a computer with accelerator such as a graphics processing unit (GPU) etc. The computational device 102 may be coupled to any suitable network 110, such as, a local area network, a wide area network, the Internet, an intranet. In certain embodiments, the computational device 102 may be an element in a cloud computing environment. In alternative embodiments, the components, applications, data, and data structures shown in the computational device 102 may be distributed among a plurality of computational devices coupled by the network 110.

A plurality of artificial intelligence processes 106 may execute in the computational device 102. An artificial intelligence process 106 may comprise a machine learning environment, such as a deep learning environment. A machine learning framework (e.g., PyTorch*, TensorFlow*, etc.) may be included in the artificial intelligence process 106.

Datasets 108 that include source files may be used for training and validation of the artificial intelligence process 106. Once the artificial intelligence process 106 has been trained and validated, the artificial intelligence process 106 may be used such that if an input is provided to the artificial intelligence process 106, then an output is generated to make predictions or decisions.

In certain embodiments an artificial intelligence platform 104 may be implemented in the computational device 102. The artificial intelligence platform 104 is used to manage both the datasets 108 and the plurality of artificial intelligence processes 106.

In certain embodiments, the artificial intelligence platform 104 may be comprised of an artificial intelligence platform management application 112 and a plurality of artificial intelligence platform components 114. In certain embodiments, the artificial intelligence platform management application 112 may be implemented in software, hardware, firmware, or any combination thereof.

The artificial intelligence platform components 114 may be comprised of a set of metafiles 116 generated by the artificial intelligence platform management application 112 from the datasets 108 and the artificial intelligence processes 106. The set of metafiles 116 may comprise an input metafile 118 and a runtime metafile 120. The input metafile 118 at least stores information related to each file, such as source, repository location, file path or object Universal Resource Locator (URL), filename, input/output protocol, retrieval instruction, access pattern, and labels, etc., in the datasets 108. The runtime metafile 120 at least stores information related to the runtime environment of an artificial intelligence process 106.

The artificial intelligence platform components 114 also include an application programming interface (API) 122 to access the set of metafiles 116. The artificial intelligence platform components 114 also includes a cache 124 that is a type of storage.

In certain embodiments, the APIs 122 are used to store information in the cache 124 based on information included in the set of metafiles 116. The information stored in the cache 124 may be used for recreating the execution of an artificial intelligence process 106.

Therefore, FIG. 1 shows certain embodiments for generating a metadata-driven artificial intelligence platform 104 that manages a plurality of artificial intelligence processes 106 and a plurality of datasets 108 corresponding to the artificial intelligence processes 106.

Figure 2:
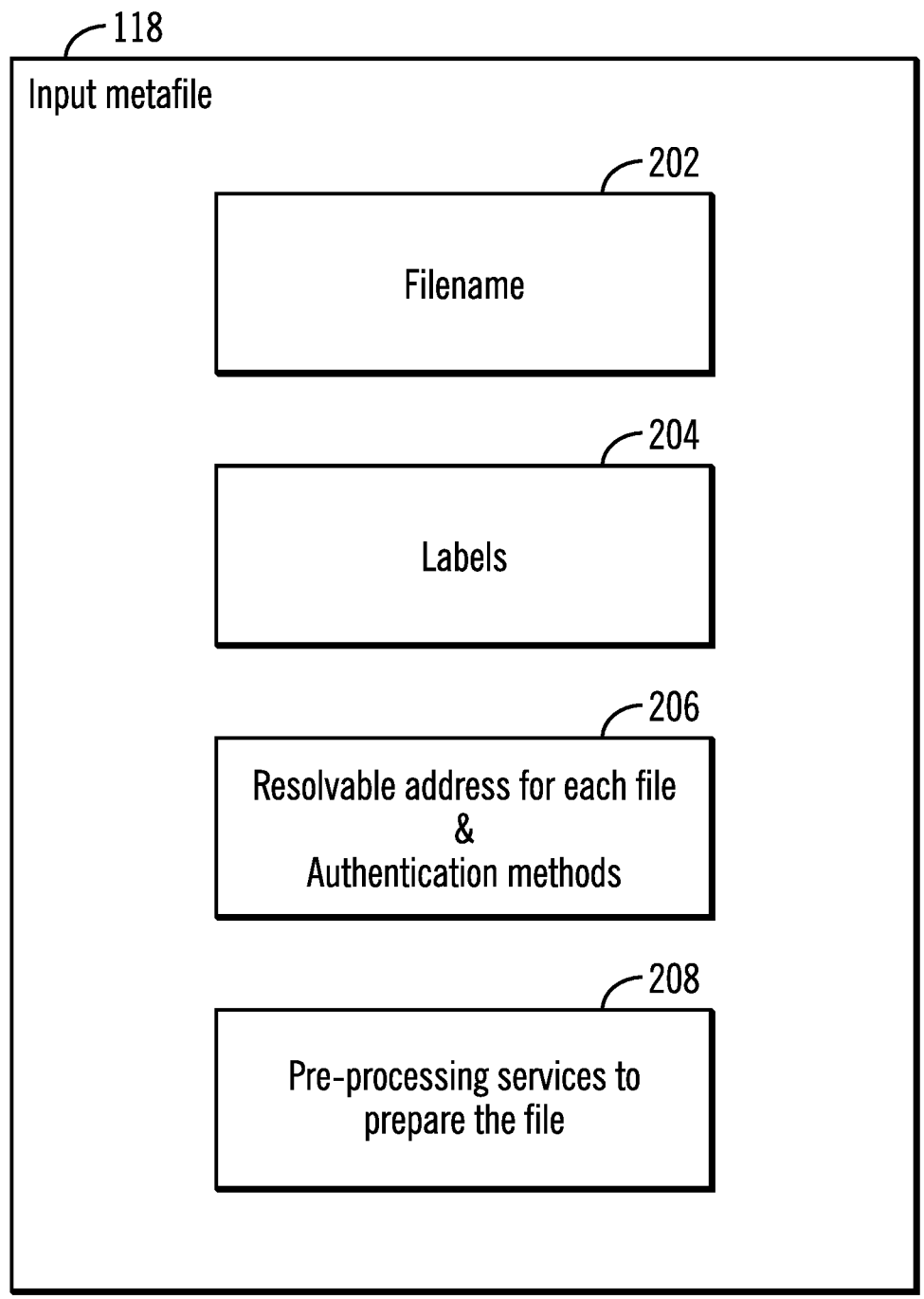
FIG. 2 illustrates a block diagram that shows the components of an input metafile in the AI platform, in accordance with certain embodiments.

FIG. 2 illustrates a block diagram that shows the components of an input metafile 118 in the AI platform 104, in accordance with certain embodiments. In certain embodiments, the components of the input metafile 118 may be generated by the artificial intelligence platform management application 112 by analyzing the datasets 108.

The input metafile 118 may store the filenames 202 included in the datasets 108 and labels 204 corresponding to the files in the datasets 108.

Additionally, the input metafile 118 may include the resolvable address for each file along with authentication methods similar to those used in domain name service (DNS) mechanisms (as shown via reference numeral 206). Any necessary pre-processing services to prepare the files are also stored in the input metafile 118 (as shown via reference numeral 208).

While FIG. 2 shows an input metafile with reference to files, in alternative embodiments the input metafile 118 may be generated for objects or other data structures.

Figure 3:
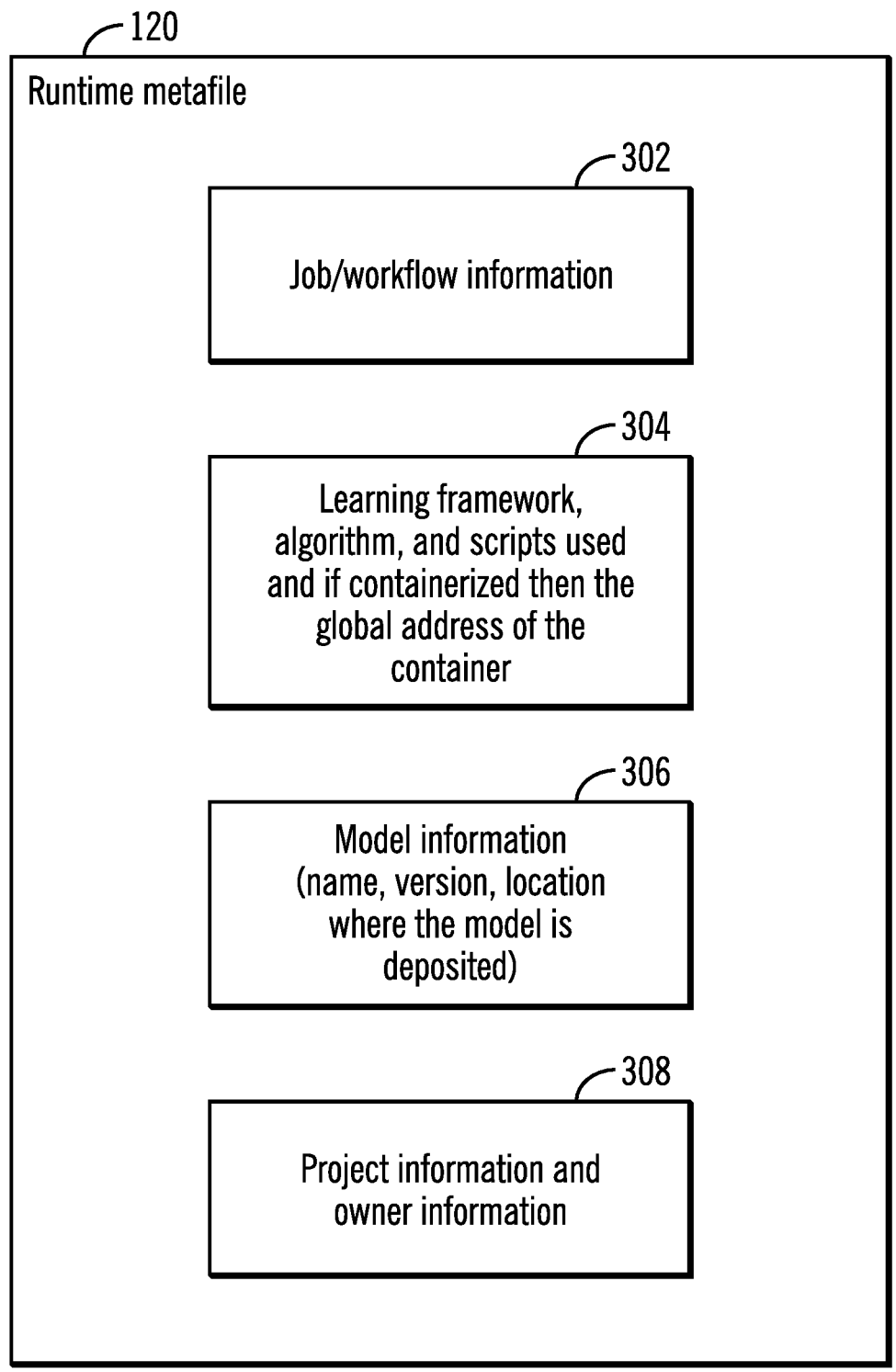
FIG. 3 illustrates a block diagram that shows the components of a runtime metafile in the AI platform, in accordance with certain embodiments.

FIG. 3 illustrates a block diagram that shows the components of a runtime metafile 120 in the AI platform 104, in accordance with certain embodiments. In certain embodiments, the components of the runtime metafile 120 may be generated by the artificial intelligence platform management application 112 by analyzing the runtime execution environment of the AI process 106.

The runtime metafile 120 may store the job and/or workflow information 302. Additionally, the runtime metafile 120 may also store the framework, algorithm and scripts used by the AI process 106 and if containerized then the global address of the container (as shown via reference numeral 304).

The runtime metafile 120 may also include the model information such as the name, version, location where the model is deposited, etc. (as shown via reference numeral 306). Additionally, the project information and owner information of the project in which the AI process 106 is executed is also stored in the runtime metafile 120 (as shown via reference numeral 308). Thus, the runtime metafile 120 stores the provenance information, wherein the provenance information comprises information relating to a framework, an algorithm, hyperparameters, training data set and a model of the AI process 106.

Figure 4:
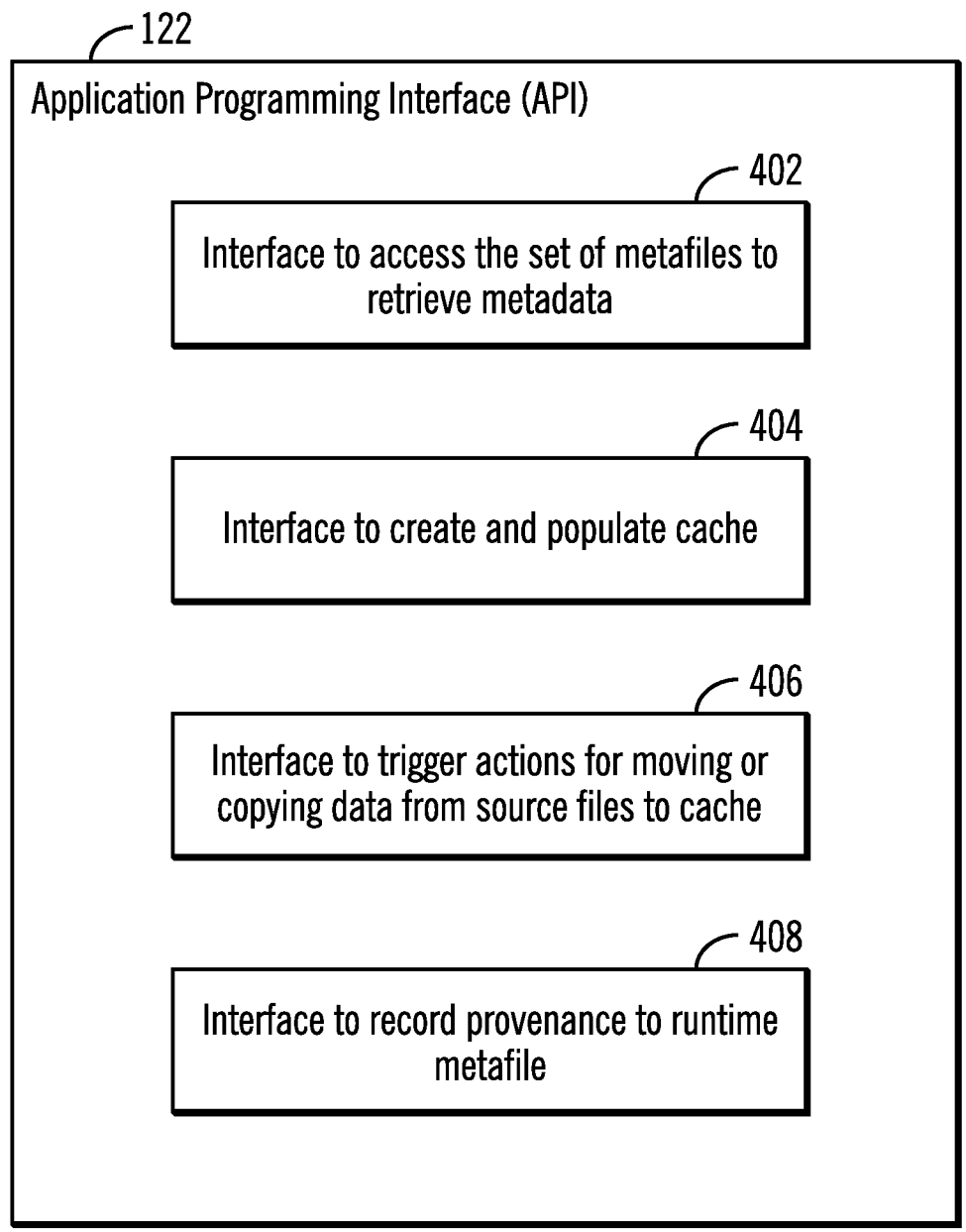
FIG. 4 illustrates a block diagram that shows exemplary interfaces of an application programming interface (API) of the AI platform, in accordance with certain embodiments.

FIG. 4 illustrates a block diagram that shows exemplary interfaces of an application programming interface (API) 122 of the AI platform, 104 in accordance with certain embodiments. In certain embodiments, the APIs 122 may be used by the artificial intelligence platform management application 112.

In certain embodiments, the APIs 122 may include functions to access the input metafile to retrieve metadata (reference numeral 402). The APIs may also include an interface to create and populate the cache 124 (reference numeral 404).

The APIs 122 may include functions to trigger action such as moving or copying data from source 108 to the cache 124 (as shown via reference numeral 408). The APIs 122 may also include functions to record provenance to the runtime metafile 120. The functions are accessed via interfaces provided by the APIs 122.

Thus FIG. 4 shown certain embodiments in which the API 122 is comprised of: a first interface 402 to access the set of metafiles to retrieve metadata; a second interface 404 to generate the cache; a third interface 406 to trigger actions including moving or copying of data to the cache; and a fourth interface 408 to record the provenance information in the runtime metafile.

Figure 5:
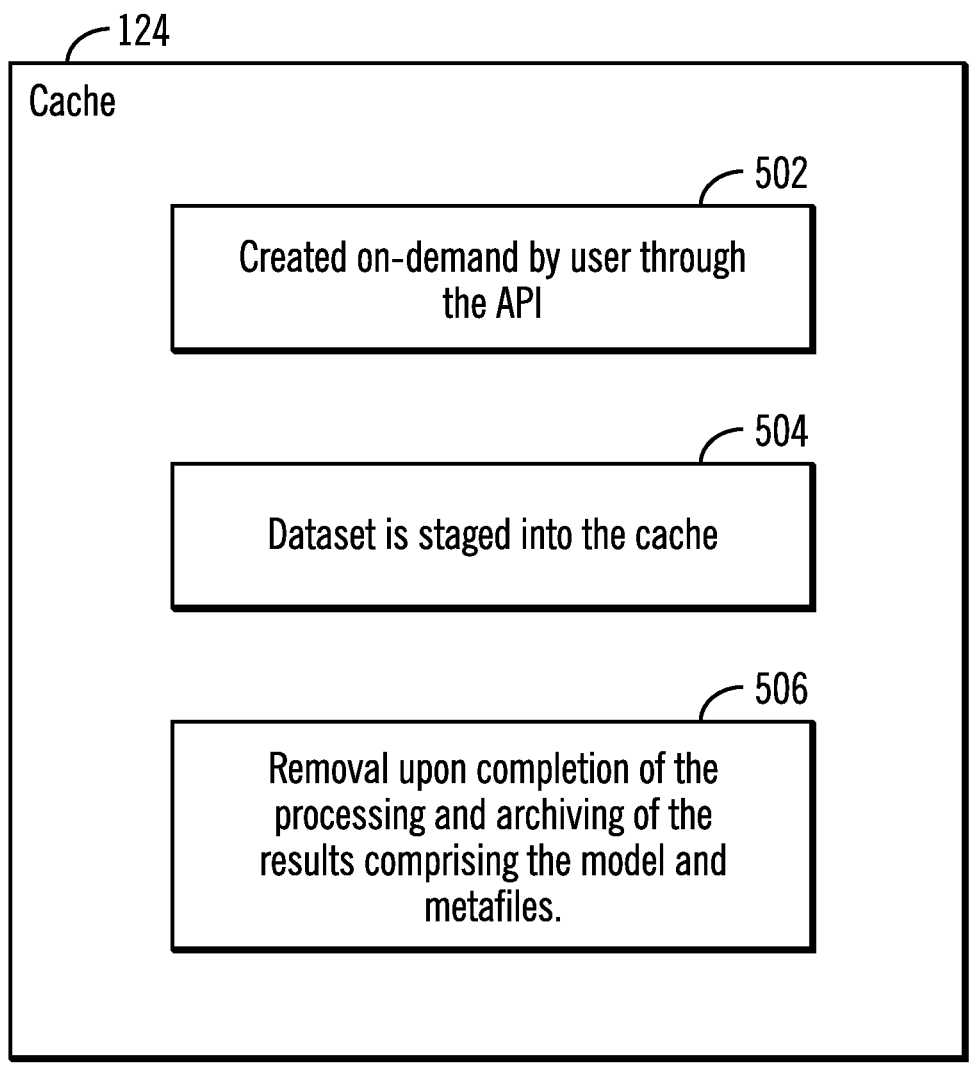
FIG. 5 illustrates a block diagram that shows operations associated with a cache in the AI platform, in accordance with certain embodiments.

FIG. 5 illustrates a block diagram that shows operations associated with a cache 124 in the AI platform, 104 in accordance with certain embodiments. In certain embodiments, the operations on the cache 124 are performed by the AI platform management application 112.

The cache 124 may be created on-demand by user through the API 122 (as shown via reference numeral 502).

In certain embodiments, the dataset is staged to the cache 124 (as shown via reference numeral 504). Additionally, in certain embodiments, a removal is performed upon completion of the processing and archiving of the results comprising the model and metafiles (as shown via reference numeral 506).

Figure 6:
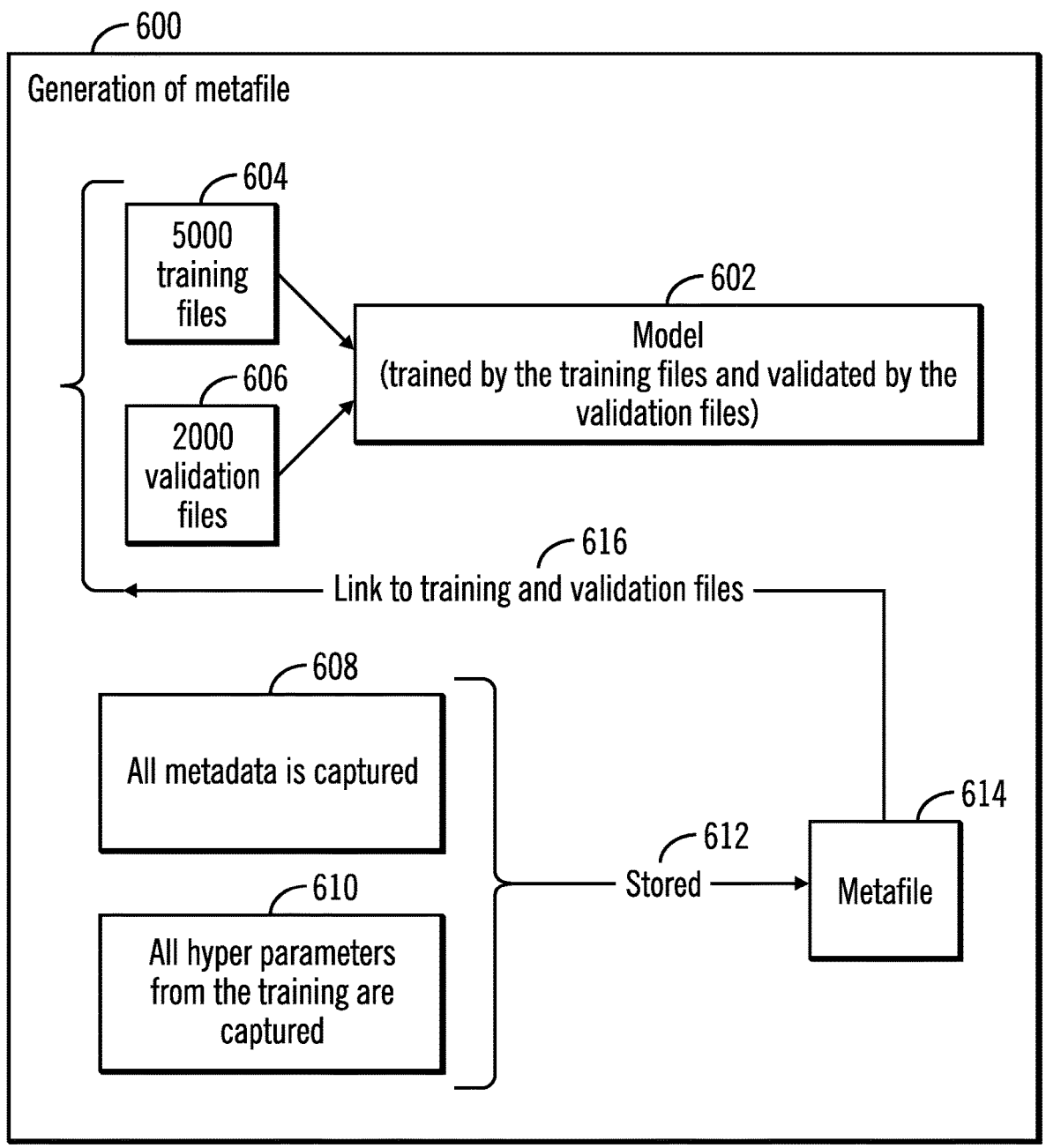
FIG. 6 illustrates a block diagram that shows the generation of a metafile in the AI platform, in accordance with certain embodiments.

FIG. 6 illustrates a block diagram that shows the generation of a metafile 600 in the AI platform 104, in accordance with certain embodiments. The generation of the metafile 600 in the AI platform 104 may be performed by the artificial intelligence platform management application 112.

In certain embodiments, a model 602 is trained using 5000 files for training (reference numeral 604) and 2000 files for validation (reference numeral 606).

In certain embodiments, the AI platform management application 112 captures all the metadata (for example by capturing data provenance) [as shown via reference numeral 608]. Additionally, all hyper parameters are captured from the training of the AI process 106 (as shown via reference numeral 610).

The captured metadata and the hyper parameters are placed into a single metafile 614 and Uniform Resource Locators (URL) or other types of links are created for each of the training and validation files which are registered with a global or local DNS file indicative of a provenance source of truth (as shown via reference numeral 616). The metafile 614 may also be used to recreate the creation of the inference model and is portable by using APIs 122 for access.

Figure 7:
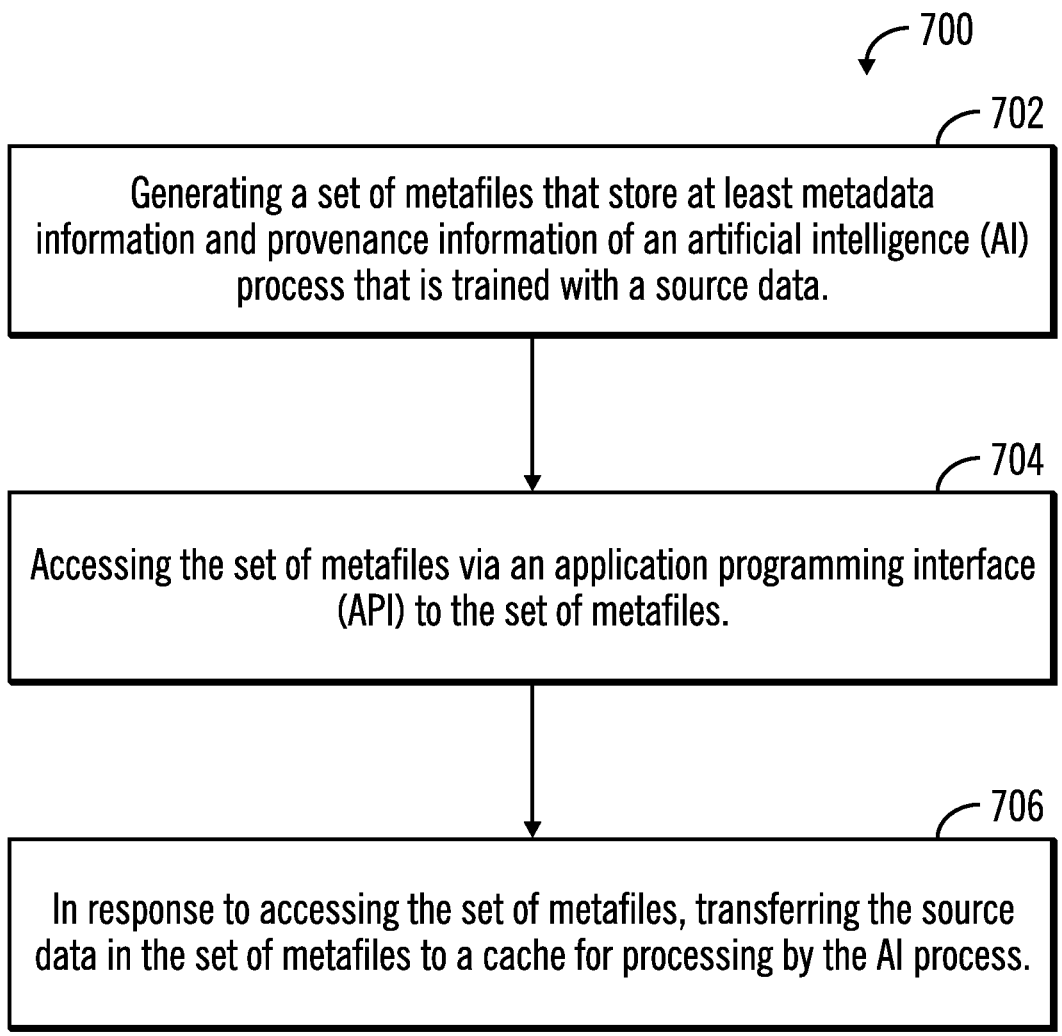
FIG. 7 illustrates a flowchart that shows operations performed for generating a metadata-driven AI platform, in accordance with certain embodiments.

FIG. 7 illustrates a flowchart 700 that shows operations performed for generating a metadata-driven AI platform, in accordance with certain embodiments. In certain embodiments, the operations shown in FIG. 7 are performed by the artificial intelligence platform management application 112.

Control starts at block 702 in which set of metafiles 116 that stores at least metadata information and provenance information of an artificial intelligence (AI) process 106 is generated, where the AI process 106 is trained with a source data 108, where the source data 108 is part of a dataset.

From block 702 control proceeds to block 704 in which the set of metafiles 116 is accessed via an application programming interface (API) 122 to the set of metafiles 116. The set of metafiles 116 is comprised of an input metafile 118 and a runtime metafile. The runtime metafile 120 stores the provenance information, wherein the provenance information comprises information relating to a framework, an algorithm, and a model of the AI process. The input metafile 118 stores meta information to each file (e.g., source, repository location, file path or object URL, filename, input/output protocol, retrieval instruction, access pattern, and labels). A retrieval instruction provides the most updated procedure to authenticate access to the source file based on a user credential. An access pattern data structure records the history of requests and the frequency of successful or failed file retrievals from the source. The labels 204 store file-specific metadata tags to facilitate fine-grain mapping and selection based on criteria such as cost, size of file, networking distance, latency, permissions, and availability. As multiple sources may be stored in a metafile for any given file, the labels 204 may optimize the selection or provide a backup option to retrieve all the necessary files to meet the dataset requirements for model training.

From block 704 control proceeds to block 706 in which in response to accessing the set of metafiles 116, the source data 108 in the set of metafiles 116 is transferred to a cache 124 for processing by the AI process 106.

Therefore, FIGS. 1-7 illustrate certain embodiments that containerize the input datasets, the provenance, the runtime environments associated with AI processes 106 and the AI processes 106. The AI platform 104 that is created is used to manage the AI processes 106 and also used to manage the corresponding datasets 108 to the AI processes 106.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
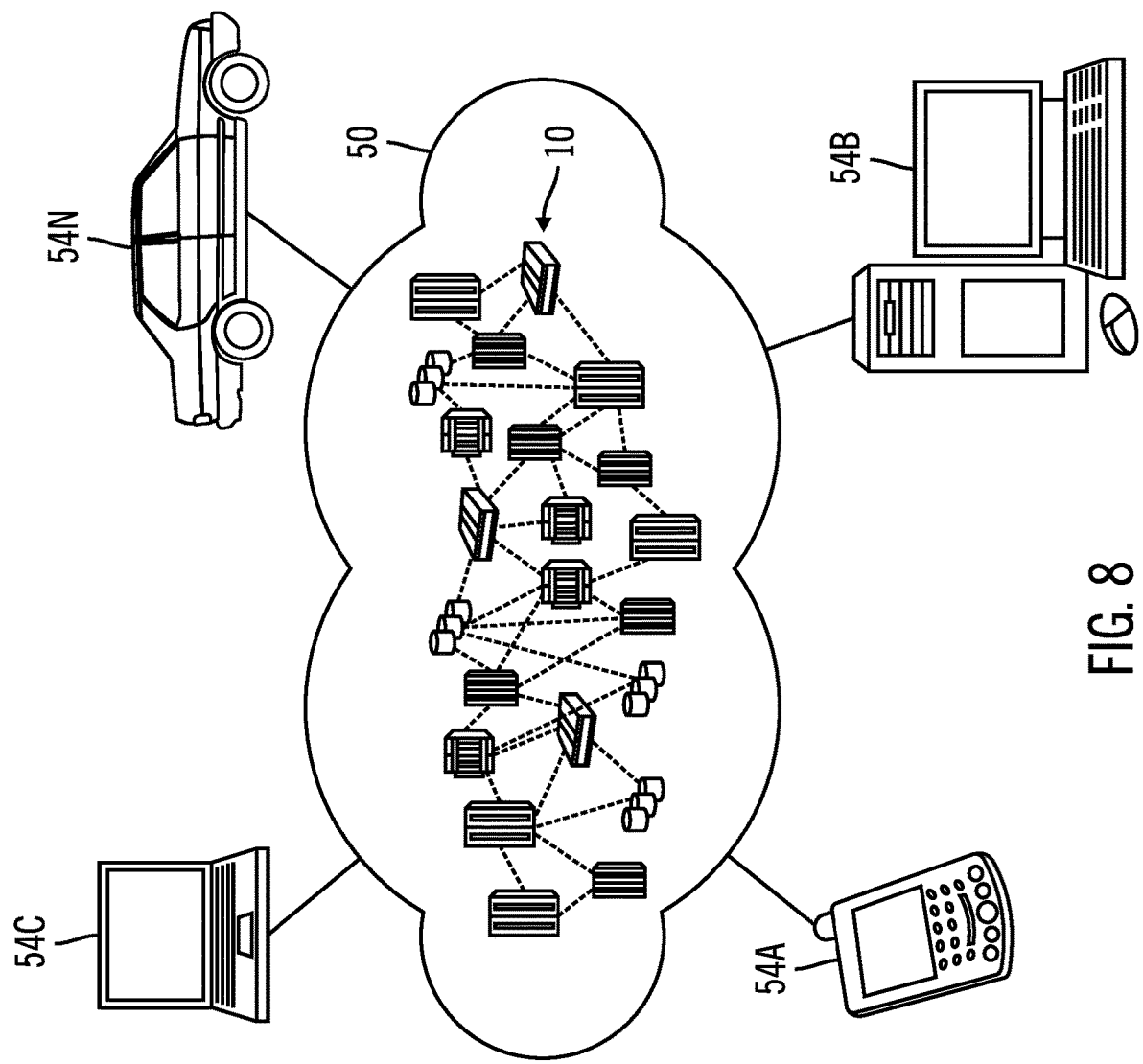
FIG. 8 illustrates a block diagram of a cloud computing environment, in accordance with certain embodiments.

Referring now to FIG. 8 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
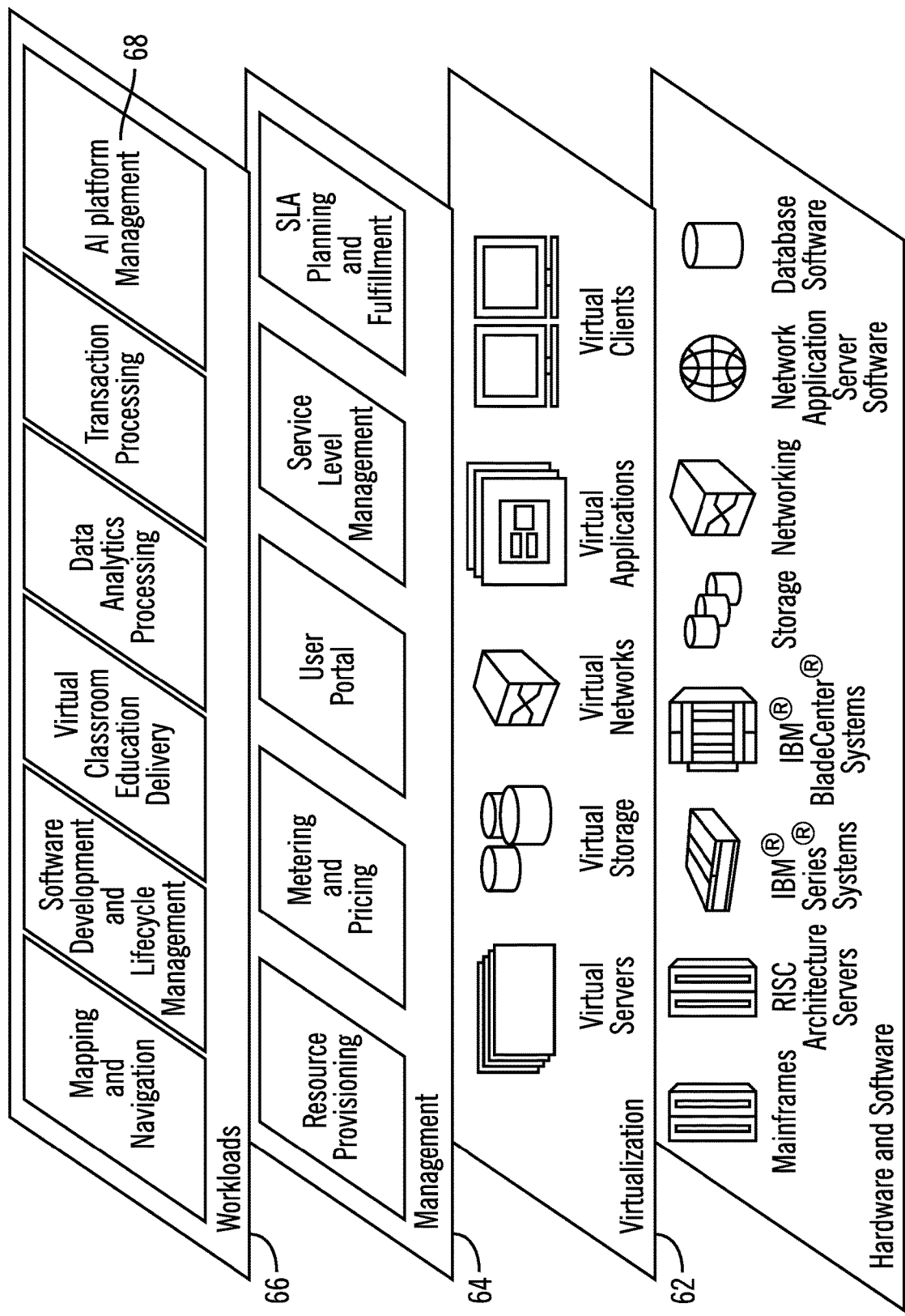
FIG. 9 illustrates a block diagram of further details of the cloud computing environment of FIG. 9, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM Web Sphere* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and artificial intelligence platform management 68 as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
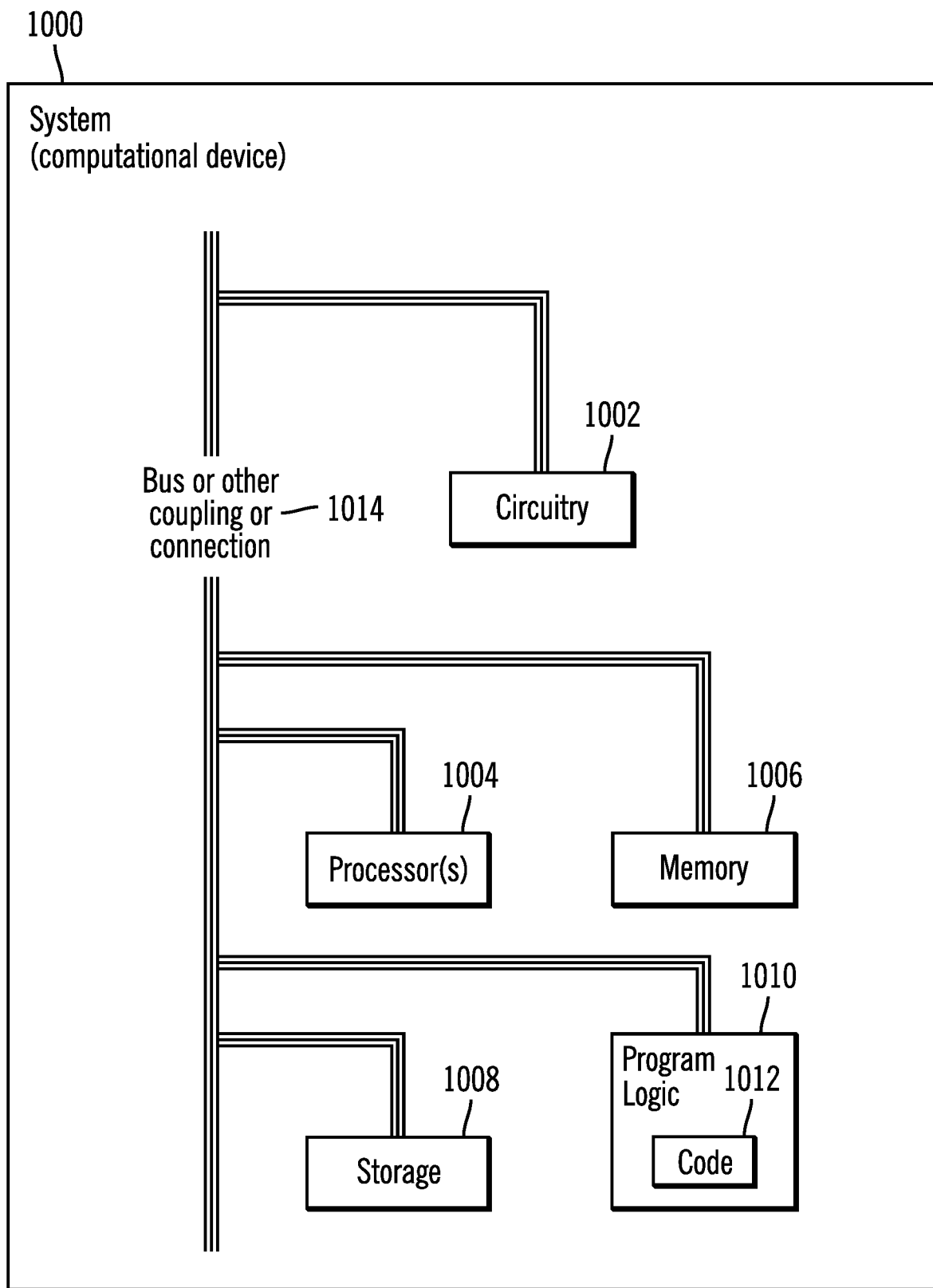
FIG. 10 illustrates a block diagram of a computational system as described in FIGS. 1-9, in accordance with certain embodiments.

FIG. 10 illustrates a block diagram of a system 1000 that shows certain elements that may be included in the computational device 102 in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter the invention, the invention resides in the claims hereinafter appended.

* IBM, zSeries, pSeries, xSeries, BladeCenter, Web Sphere, IBM Watson, and DB2 are trademarks of International Business Machines Corporation registered in many jurisdictions worldwide. PyTorch is a trademark of Facebook, Inc. Tensorflow is a trademark of Google, Inc.

What is claimed is:

1. A method, comprising:
generating, via a computational device, a set of metafiles that store at least metadata information and provenance information of an artificial intelligence (AI) process that is trained with a source data;
accessing, via the computational device, the set of metafiles via an application programming interface (API) to the set of metafiles; and
in response to accessing the set of metafiles, transferring, via the computational device, the source data in the set of metafiles to a cache for processing by the AI process, wherein the set of metafiles is comprised of an input metafile and a runtime metafile, and wherein the runtime metafile stores information related to a runtime environment of the AI process.

2. The method of claim 1, wherein the runtime metafile stores the provenance information, and wherein the provenance information comprises information relating to a framework, an algorithm, and a model of the AI process.

3. The method of claim 1, wherein the input metafile stores at least filenames and resolvable addresses of each file of the source data.

4. The method of claim 1, wherein the API is comprised of:
a first interface to access the set of metafiles to retrieve metadata;
a second interface to generate the cache;
a third interface to trigger actions including moving or copying of data to the cache; and
a fourth interface to record the provenance information in the runtime metafile.

5. A system, comprising:
a memory; and
a processor coupled to the memory, wherein the processor executes operations, the operations comprising:
generating a set of metafiles that store at least metadata information and provenance information of an artificial intelligence (AI) process that is trained with a source data;
accessing the set of metafiles via an application programming interface (API) to the set of metafiles; and
in response to accessing the set of metafiles, transferring the source data in the set of metafiles to a cache for processing by the AI process, wherein the set of metafiles is comprised of an input metafile and a runtime metafile, and wherein the runtime metafile stores information related to a runtime environment of the AI process.

6. The system of claim 5, wherein the runtime metafile stores the provenance information, and wherein the provenance information comprises information relating to a framework, an algorithm, and a model of the AI process.

7. The system of claim 5, wherein the input metafile stores at least filenames and resolvable addresses of each file of the source data.

8. The system of claim 5, wherein the API is comprised of:
a first interface to access the set of metafiles to retrieve metadata;
a second interface to generate the cache;
a third interface to trigger actions including moving or copying of data to the cache; and
a fourth interface to record the provenance information in the runtime metafile.

9. A computer program product comprising a computer readable storage medium having computer readable program code embodied therewith, the computer readable program code configured to perform operations, the operations comprising:

generating a set of metafiles that store at least metadata information and provenance information of an artificial intelligence (AI) process that is trained with a source data;

accessing the set of metafiles via an application programming interface (API) to the set of metafiles; and in response to accessing the set of metafiles, transferring the source data in the set of metafiles to a cache for processing by the AI process, wherein the set of metafiles is comprised of an input metafile and a runtime metafile, and wherein the runtime metafile stores information related to a runtime environment of the AI process.

10. The computer program product of claim 9, wherein the runtime metafile stores the provenance information, and wherein the provenance information comprises information relating to a framework, an algorithm, and a model of the AI process.

11. The computer program product of claim 9, wherein the input metafile stores at least filenames and resolvable addresses of each file of the source data.

12. The computer program product of claim 9, wherein the API is comprised of:
a first interface to access the set of metafiles to retrieve metadata;
a second interface to generate the cache;
a third interface to trigger actions including moving or copying of data to the cache; and
a fourth interface to record the provenance information in the runtime metafile.

13. An artificial intelligence platform for managing a set of artificial intelligence processes in a computational device, the artificial intelligence platform comprising:
a set of metafiles, wherein the set of metafiles store at least metadata information and provenance information of an artificial intelligence (AI) process that is trained with a source data;
an application programming interface (API) for accessing the set of metafiles; and
a cache, to which the source data in the set of metafiles is transferred for processing by the AI process, in response to accessing the set of metafiles, wherein the set of metafiles is comprised of an input metafile and a runtime metafile, and wherein the runtime metafile stores information related to a runtime environment of the AI process.

14. The artificial intelligence platform of claim 13, wherein the runtime metafile stores the provenance information, and wherein the provenance information comprises information relating to a framework, an algorithm, and a model of the AI process.

15. The artificial intelligence platform of claim 13, wherein the input metafile stores at least filenames and resolvable addresses of each file of the source data.

16. The artificial intelligence platform of claim 13, wherein the API is comprised of:
a first interface to access the set of metafiles to retrieve metadata;
a second interface to generate the cache;
a third interface to trigger actions including moving or copying of data to the cache; and
a fourth interface to record the provenance information in the runtime metafile.

17. An application programming interface (API) for a metadata-driven artificial intelligence platform implemented in a computational device, wherein the API is comprised of:
a first interface to access a set of metafiles to retrieve metadata;
a second interface to generate a cache;
a third interface to trigger actions including moving or copying of data to the cache; and
a fourth interface to record a provenance information in a runtime metafile, wherein the set of metafiles is comprised of an input metafile and the runtime metafile, and wherein the runtime metafile stores information related to a runtime environment of an Artificial Intelligence (AI) process.

18. The application programing interface of claim 17, wherein the metadata-driven artificial intelligence platform is comprised of:
the set of metafiles, wherein the set of metafiles store at least metadata information and the provenance information of the AI process wherein the AI process is trained with a source data;
the application programming interface for accessing the set of metafiles; and
the cache to which the source data in the set of metafiles is transferred for processing by the AI process, in response to accessing the set of metafiles.

19. The application programing interface of claim 18, wherein the runtime metafile stores the provenance information, and wherein the provenance information comprises information relating to a framework, an algorithm, and a model of the AI process.

20. The application programing interface of claim 18, wherein the input metafile stores at least filenames and resolvable addresses of each file of the source data.

* * * * *